United States Patent [19]
Goodacre

[11] 3,724,586
[45] Apr. 3, 1973

[54] PEDESTRIAN OPERATED INDUSTRIAL TRUCKS

[75] Inventor: Cecil Goodacre, Basingstoke, England

[73] Assignee: Lansing Bagnall Limited, Basingstoke, England

[22] Filed: May 5, 1971

[21] Appl. No.: 140,524

[52] U.S. Cl. .....................180/91, 74/2, 192/129 R, 192/138, 180/19 R
[51] Int. Cl. ..............................................B60k 27/08
[58] Field of Search........180/19 R, 19 H, 19 S, 65 R, 180/91, 96; 74/2; 192/129 R, 138, 148

[56] References Cited

UNITED STATES PATENTS

| | | | |
|---|---|---|---|
| 3,477,539 | 11/1969 | De Pung et al. | 180/91 |
| 2,619,209 | 11/1952 | Horn | 180/19 H X |
| 2,942,679 | 6/1960 | Gibson | 180/91 |
| 2,902,105 | 9/1959 | Wiley et al. | 180/91 |
| 3,147,818 | 9/1964 | Howard et al. | 180/91 |
| 3,411,060 | 11/1968 | De Pung et al. | 180/91 X |

*Primary Examiner*—Kenneth H. Betts
*Assistant Examiner*—Leslie J. Paperner
*Attorney*—Martin Kirkpatrick

[57] ABSTRACT

A pedestrian operated industrial truck has a reversible driving motor controlled by control means which are operated, through a connecting linkage, by a manually operable control member, the control member and linkage having a forward, neutral, and reverse conditions. There is mounted on a control handle of the truck an element which is displaceable relatively to the truck by engagement with an obstruction during forward movement of the truck. The manually operable control member is coupled with the connecting linkage by a releasable connection, and displacement of the displaceable element is arranged to release the connection and effect movement of the linkage, independently of the manually operable control member, from the forward to the reverse condition. Subsequent return of the displaceable element to its original position, upon reversal of the truck away from the obstruction, allows the linkage to return to the neutral condition, so stopping the truck, and the releasable connection is then automatically re-engageable only when the manually operable control member is also returned to the neutral condition.

8 Claims, 3 Drawing Figures

3,724,586

PEDESTRIAN OPERATED INDUSTRIAL TRUCKS

The invention relates to pedestrian operated industrial trucks of the kind having a reversible driving motor controlled by control means which are operated, through a connecting linkage, by a manually operable control member, the control member and linkage having a forward, neutral, and reverse conditions, and wherein there is mounted on a part of the truck an element arranged to be displaceable relatively to the truck by engagement with an obstruction during forward movement of the truck (i.e., towards the operator), a displacement of the element being arranged to effect reversal of the driving motor.

According to the invention there is provided an industrial truck of this kind wherein the manually operable control member is coupled with said connecting linkage by a releasable connection, and wherein the aforesaid displaceable element is arranged, when displaced, to release said connection and effect movement of the linkage, independently of the manually operable control member, from the forward to the reverse condition, subsequent return of the displaceable element to its original position, upon reversal of the truck away from the obstruction, allowing the linkage to return to the neutral condition, so stopping the truck, and the releasable connection then being automatically re-engageable only when the manually operable control member is also returned to the neutral condition.

Thus, should the operator hold the manual control member in the forward condition after the truck has hit the obstruction and been reversed, the truck will not move forward again after it has moved away from the obstruction but will stop and it will be necessary for the operator to return the manual control member to the neutral condition to re-engage the releasable connection before the truck can be moved in forward or reverse again.

The releasable connection may comprise a latch mechanism which is mechanically disengaged by displacement of said element.

Preferably the latch mechanism is disengaged against the action of a spring, which spring automatically reengages the connection when both the linkage and manually operable control member are in the neutral condition.

The latch mechanism may comprise a pawl mounted on a part of the connecting linkage and engageable with a detent on a part movable with the control member. The detent may comprise a notch or recess in said part. Said parts may be co-axially rotatable.

A part of said displaceable element may be arranged, during a first part of its displacement, to engage the pawl and move it out of engagement with said detent and, during a second part of its displacement, to engage part of the connecting linkage and move it in such a manner as to move the linkage to its reverse condition.

The displaceable element may be pivotally mounted on a part of the truck.

In any of the above arrangements spring means are preferably provided to return the linkage to the neutral condition.

The following is a more detailed description of one embodiment of the invention reference being made to the accompanying drawings in which.

Figure 1:
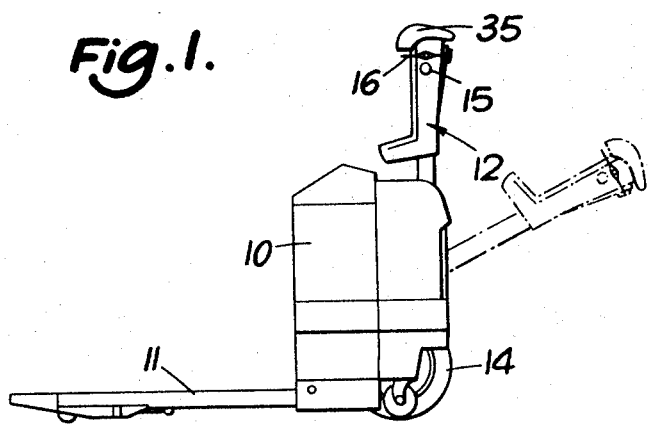
FIG. 1 is a side elevation of a pedestrian operated industrial truck.

Referring to FIG. 1 the pedestrian operated industrial truck comprises a body portion 10 having a load carrying portion 11 mounted thereon, and a combined steering and control arm 12 pivotally mounted on the body portion at the end which is remote from the load carrying portion. The control arm 12 is pivotable about a horizontal axis extending transversely of the truck and also about a vertical axis. Pivotal movement of the control arm about the horizontal axis applies and releases a brake mechanism on the truck, the control arm being spring loaded into its vertical position. Pivotal movement of the control arm about its vertical axis effects steering movements of a driven steerable ground wheel 14 mounted below the body portion, the wheel 14 being provided with a reversible electric driving motor mounted in the hub of the wheel. Handles 15 are provided on the control arm to enable the operator to pivot the arm about the vertical axis to steer the truck.

The load carrying portion 11 of the truck may be raised and lowered relatively to the body portion 10 by means of one or more jacks (not shown) operated by lift and lower buttons provided on the control arm 12.

Associated with the motor driving the ground wheel 14 is a control mechanism which is operated, in a manner to be described, from butterfly levers 16 mounted on the control arm 12.

Figure 2:
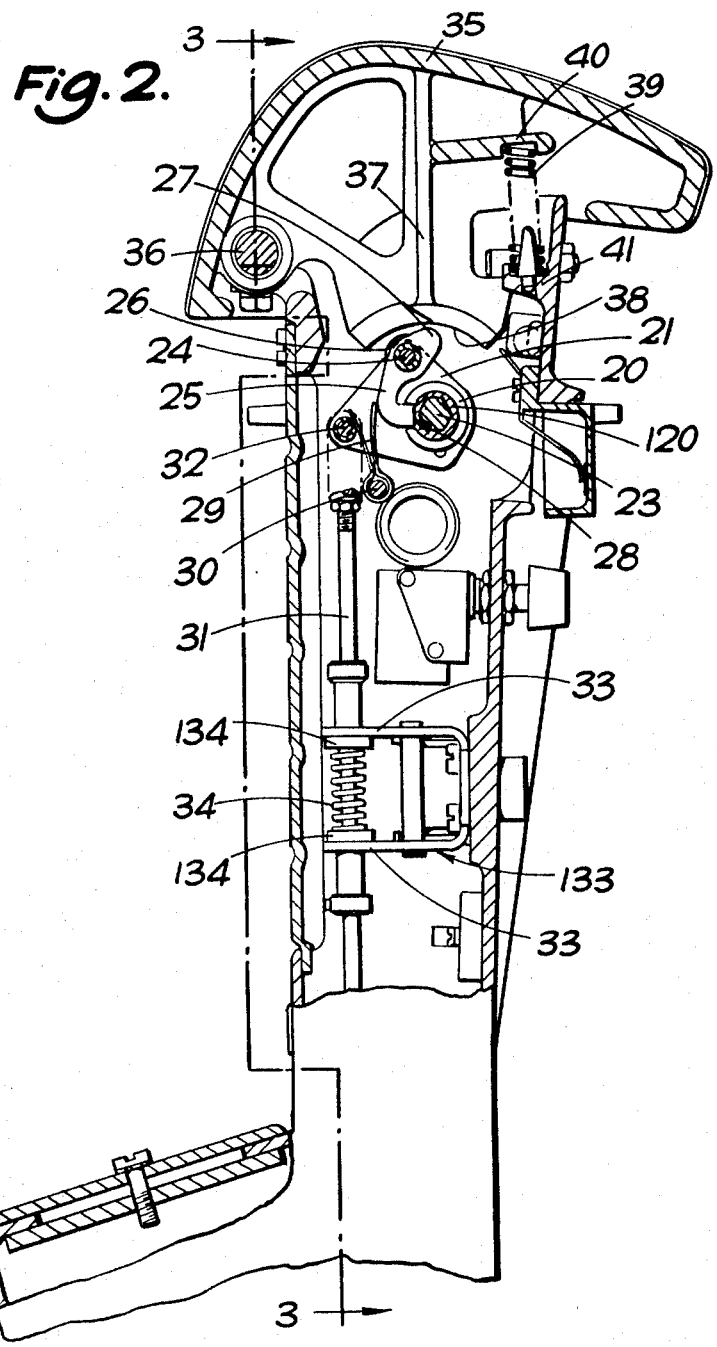
FIG. 2 is a part vertical section on the line 2—2 of FIG. 3, and a part side elevation of the control arm of the truck shown in FIG. 1.
Figure 3:
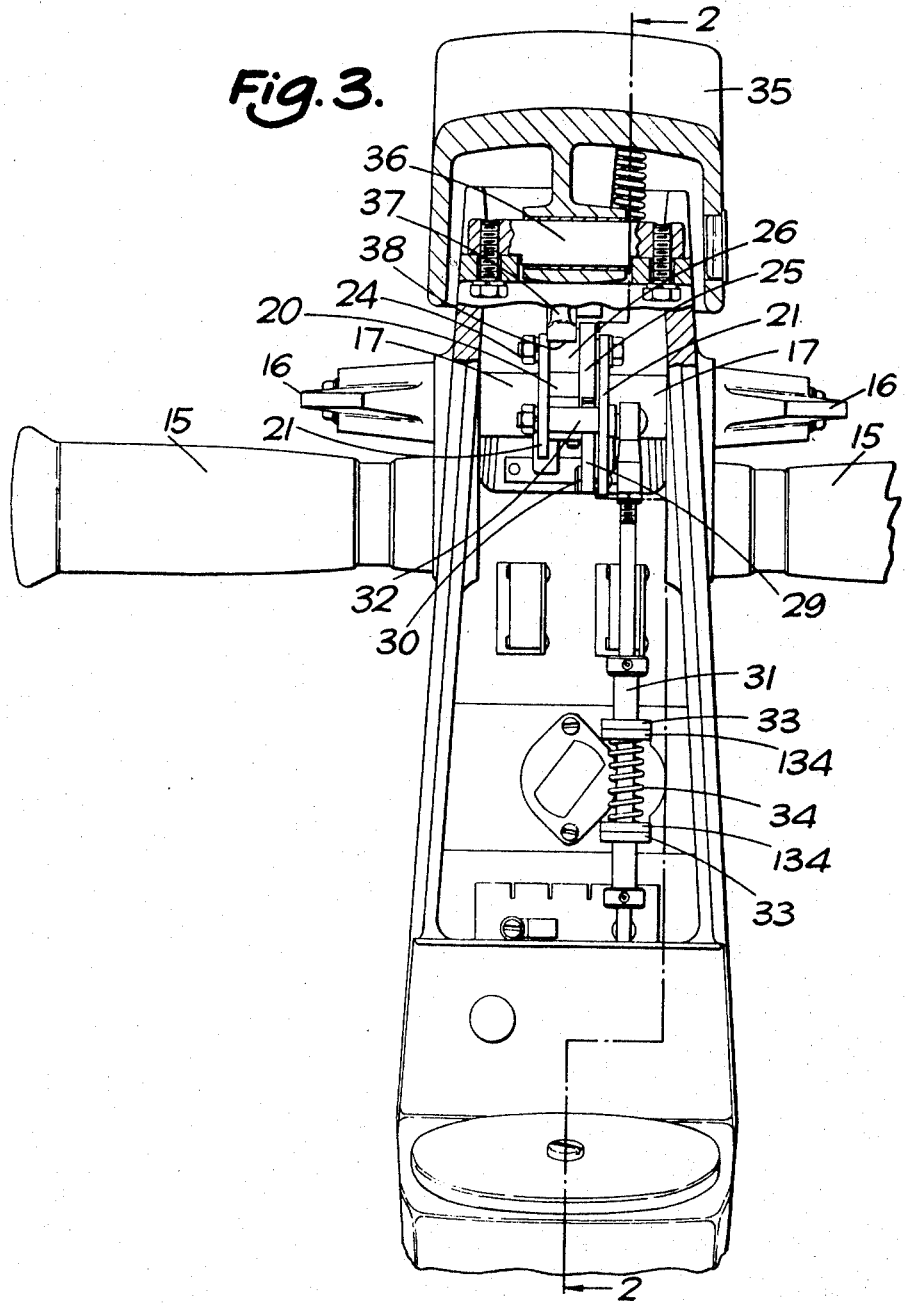
FIG. 3 is a vertical section on the line 3—3 of FIG. 2.

Referring to FIGS. 2 and 3; there are provided two butterfly levers 16. Each lever is provided with an extension 17 carried in a bearing on the control arm 12 and formed with a central hexagonal hole to receive a shaft 23 which connects the two levers 16. Mounted on the shaft 23 between the levers 16 is a circular pawl wheel 20 and disposed on opposite sides of the pawl wheel 20 are lever plates 21 each of which has an aperture into which projects a reduced diameter part 120 of the pawl wheel 20. The lever plates 21 are therefore pivotable together about the axis of the shaft 23.

The lever plates 21 are connected by a pin 24 on which is pivotally mounted a pawl 25 adjacent which is disposed a roller 26, the periphery of the roller 26 and a nose 27 on the pawl 25 projecting beyond the edges of the plates 21 as best seen in FIG. 2.

The end of the pawl 25 remote from the nose 27 is engageable with a notch 28 in the periphery of the pawl wheel 20. The pawl is urged into engagement with the notch by a leaf spring 29 which is mounted on a pin 30 extending from one of the plates 21. An operating rod 31 connected to the control means for the drive motor of the truck is connected at its upper end to the plates 21 by means of a ball joint mounted on a pin 32 extending between the plates. The end of the spring 29 bears against the pin 32.

The operating rod 31 passes through the arms 33 of a channel shaped bracket 133 carried in the handle 12, and around the rod 31 between the arms 33, is a helical spring 34 which engages abutments 134 on the rod 31, said abutments, in turn, engaging the arms 33 of the bracket 133. The arrangement is such that, in known manner, the spring 34 is compressed by both upward and downward movement of the rod 31.

Referring to FIGS. 2 and 3 a displaceable element 35 is pivotally mounted on a shaft 36 on the control arm 12, the upper surface of the element 35 projecting beyond the edge of the handle on the control arm.

This displaceable element 35 is formed with a pillar 37 on the lower end of which is formed an arcuate cam surface 38. A helical compression spring 39 is mounted between abutments 40 and 41 on the displaceable element 35 and control arm 12 respectively.

The operation of the arrangement is as follows: When the parts are in the position shown in FIG. 2 the butterfly levers 16 and the operating rod 31 are in a neutral condition and the truck is at rest. Rotation of either of the butterfly levers 16 clockwise (as viewed in FIG. 2) rotates the pawl wheel 20 clockwise and since the pawl 25 is in engagement with the notch 28 the plates 21 are also rotated clockwise. The operating rod 31 is therefore moved upwardly and this operates the control mechanism for the driving motor, in known manner, so as to drive the vehicle forwards (i.e., towards the operator). The speed of the vehicle depends on the extent to which the butterfly levers 16 are rotated.

Similarly when the butterfly levers 16 are rotated anti-clockwise the operating rod 31 is moved downwardly and the truck moves in reverse.

When the truck is moving forwards (i.e., to the right as seen in FIG. 1) the control arm 12 will be in a lowered position such as that shown in chain lines. Should the truck meet an obstacle, for example should it strike the operator, the displaceable element 35, being mounted on the end of the control arm 12 is depressed. The cam surface strikes the nose 27 of the pawl 25 and swings the pawl 25 out of engagement with the notch 28 in the pawl wheel 20. This breaks the connection between the operating rod 31 and the shaft 23 with the result that the operating rod is moved to the neutral position by the spring 34, regardless of the position of the butterfly levers 16 and shaft 23. The movement of the operating rod 31 to the neutral position stops the driving motor of the vehicle.

As the element 35 is depressed further the cam surface 38 engages the roller 26 and rotates the lever plates 21 anti-clockwise relative to the pawl wheel 20. This anti-clockwise rotation of the plates 21 moves the operating rod 31 downwardly so as to reverse the truck.

As the truck is reversed away from the obstruction the pressure on the element 35 is released and it is returned to its original position by the spring 39. At the same time the spring 34 moves the rod 31 upwardly to rotate the plates 21 in a clockwise direction to the neutral position in which the motor is stopped.

When the rod 31 and plates 21 reach the neutral position, if the operator has the whole time, been holding the butterfly lever 16 in the forward position, the notch 28 will not be in a position to receive the pawl 25 and the truck will remain stationary in spite of the fact that the butterfly levers 16 are in the forward position. This prevents the situation arising, which could occur with earlier known arrangements, in which the truck then moves forwardly again to strike the obstruction and keeps moving backwards and forwards until the butterfly levers are released.

In the present construction the pawl 25 can only re-engage the notch 28 after the butterfly levers 16 have been released and have been returned to the neutral position shown in FIGS. 2 and 3 by the spring 34. When this has occurred the truck is again ready for operation.

I claim:

1. A pedestrian operated industrial truck comprising:
   a reversible driving motor;
   control means controlling said motor and including a manually operable control member and a connecting linkage, said control member and linkage having forward, neutral, and reverse conditions;
   a displaceable element mounted on said truck, said element being displaceable relative to said truck by engagement with an obstruction during forward movement of said truck; and,
   a latch mechanism releasably coupling said control member with said connecting linkage, said latch mechanism and said displaceable mechanism being arranged such that displacement of said element from its original position releases said latch mechanism and moves said linkage, independently of said control member, from said forward to said reverse condition thereby effecting reversal of said driving motor, and subsequent return of said displaceable element to its original position upon reversal of said truck away from said obstruction permits said linkage to move into said neutral position and thereby stop said truck,
   said latch mechanism being further arranged to automatically recouple said control member and said linkage only when said control member is also moved into said neutral position.

2. A truck according to claim 1 including a spring bearing against said latch mechanism, said latch mechanism being disengaged against the action of said spring, and said spring being arranged automatically to re-engage the connection of said control member with said linkage when both said linkage and said manually operated control member are in said neutral condition.

3. A truck according to claim 1 wherein the displaceable element is pivotally mounted on a part of the truck.

4. A truck according to claim 1 wherein spring means are provided to return the linkage to the neutral condition.

5. A truck according to claim 1 wherein the latch mechanism comprises a pawl mounted on a part of the connecting linkage and engageable with a detent on a part movable with the control member.

6. A truck according to claim 5 wherein the detent comprises a recess in said part.

7. A truck according to claim 5 wherein said part of the connecting linkage and said part movable with the control member are coaxially rotatable.

8. A truck according to claim 5 wherein said displaceable element has a part which, during a first part of the displacement of the element, engages the pawl and moves it out of engagement with said detent and, during a second part of its displacement, engages said part of the linkage and moves it in such a manner as to move the linkage to its reverse condition.

* * * * *